(12) United States Patent
Mergler et al.

(10) Patent No.: US 12,287,092 B2
(45) Date of Patent: Apr. 29, 2025

(54) TEMPERATURE CONTROL SYSTEM FOR AN AIR PREHEATER INSTALLATION

(71) Applicants: Thomas G. Mergler, Bolivar, NY (US); Steven W. Kosler, Austin, TX (US); ARVOS LJUNGSTROM LLC, Wellsville, NY (US)

(72) Inventors: Thomas G. Mergler, Bolivar, NY (US); Steven W. Kosler, Austin, TX (US)

(73) Assignee: Arvos Ljungstrom LLC, Wellsville, NY (US)

( * ) Notice: Subject to any disclaimer, the term of this patent is extended or adjusted under 35 U.S.C. 154(b) by 0 days.

(21) Appl. No.: 18/277,045

(22) PCT Filed: Feb. 11, 2022

(86) PCT No.: PCT/US2022/016153
§ 371 (c)(1),
(2) Date: Aug. 11, 2023

(87) PCT Pub. No.: WO2022/174059
PCT Pub. Date: Aug. 18, 2022

(65) Prior Publication Data
US 2024/0003542 A1 Jan. 4, 2024

Related U.S. Application Data

(60) Provisional application No. 63/148,689, filed on Feb. 12, 2021.

(51) Int. Cl.
*F23N 5/02* (2006.01)
(52) U.S. Cl.
CPC ............ *F23N 5/02* (2013.01); *F23N 2221/08* (2020.01); *F23N 2225/20* (2020.01)

(58) Field of Classification Search
None
See application file for complete search history.

(56) References Cited

U.S. PATENT DOCUMENTS

| | | | |
|---|---|---|---|
| 3,273,520 | A | 9/1966 | Hottenstine |
| 4,442,783 | A | 4/1984 | Pajones et al. |
| (Continued) | | | |

FOREIGN PATENT DOCUMENTS

CN 203598668 U * 5/2014

OTHER PUBLICATIONS

Notification of Transmittal of the International Search Report and Written Opinion issued in corresponding PCT Application No. PCT/US22/16153, date mailed May 3, 2022, pp. 1-10.

*Primary Examiner* — Jason Lau
(74) *Attorney, Agent, or Firm* — Robinson & Cole LLP

(57) ABSTRACT

An air preheater (APH) temperature control system, including at least a first APH or combustion/secondary air bypass duct in metered communication with a combustion air inlet duct and a secondary air duct, adapted in use to bleed a portion of the combustion air as secondary air bypass from the air inlet duct upstream of the APH 100 for reintroduction downstream into the secondary air duct, and a flow control device for metering or controlling volumetric flow of the secondary air bypass and tempering primary air flow in use operative to maintain the flue gas outlet temperature at or above a desired minimum predetermined temperature for the incident flue gas volumetric flow exiting the APH alone or in conjunction with other tempering means maintaining mills outlet temperature within a safety range of $T10_{MIN}$ to $T10_{MAX}$.

12 Claims, 4 Drawing Sheets

(56) References Cited

U.S. PATENT DOCUMENTS

| | | |
|---|---|---|
| 4,592,293 A | 6/1986 | Toyama et al. |
| 6,089,023 A | 7/2000 | Anderson et al. |
| 2006/0090468 A1 | 5/2006 | Counterman |
| 2009/0095440 A1 | 4/2009 | Gietz et al. |
| 2009/0308292 A1* | 12/2009 | Fujimori ................ F23N 3/002 |
| | | 110/263 |
| 2010/0251942 A1 | 10/2010 | O'Boyle |

* cited by examiner

TEMPERATURE CONTROL SYSTEM FOR AN AIR PREHEATER INSTALLATION

CROSS-REFERENCE TO RELATED APPLICATIONS

The instant application is a non-provisional application of, and claims priority to PCT Application No. PCT/US2022/016153, filed on Feb. 11, 2022, which is a PCT application of and claims priority to U.S. Provisional Application No. 63/148,689, filed on Feb. 12, 2021, which is incorporated by reference in its entirety.

TECHNICAL FIELD

The present invention relates to methods and apparatus for controlling temperatures of gases exiting air preheaters for fossil fuel fired boilers, and more particularly relates to improving the operational efficiency of downstream pollution control equipment by the retrofitting of installed air preheaters of coal-fired power plants.

BACKGROUND

Steam generation systems are used for the generation of electricity and in chemical processing plants. The energy for steam generation may be provided by the combustion of fossil fuels, such as coal pulverized in a mill, natural gas or fuel oil. Coal fired steam generation systems commonly comprise a boiler (which evaporates water into steam) having a furnace in which pulverized coal is combusted, an air pre-heater ("APH"), and an exit gas ("flue gas") for the waste flue gases. The flue gas passes from the APH through a plurality of pollution control equipment designed to reduce gaseous and particulate contaminates before exiting to the atmosphere through a stack.

Typically, APH of rotary regenerative heat exchangers improve boiler efficiency by capturing heat, referred to as "waste heat", from flue gas exiting a boiler by utilizing profiled steel heat exchange elements and liberating that heat to combustion air being fed to the boiler (often in part through one or more coal mills to carry pulverized coal into the boiler furnace) and one such is a trisector APH 1, illustrated diagrammatically in FIG. 1.

The trisector APH 1 is provided at its upper end (the "hot end") and disposed circumferentially around its rotor 2: a flue gas inlet duct D1, a primary air outlet duct D4 and a secondary air outlet duct D6, with each being axially aligned respectively with: a flue gas outlet duct D2, a primary air inlet duct D3 and a secondary air inlet duct D5 disposed similarly around the rotor 2 at its lower or cold end. For ease of illustration and functional explanation the primary and secondary air ducts are shown radially disposed but the true disposition and configuration is well known in the art and oft illustrated in Applicant's marketing publications for its Ljungström® Trisector Air Preheater. The rotor 2 houses baskets of heat exchange elements as they rotate to extract heat from flue gas flowing between ducts D1 and D2 and liberate same to preheat combustion air that is fed to the boiler as the combined flows of primary air V2 flowing between ducts D3 and D4 (which is fed via one or more coal mills to carry pulverized coal to into the boiler furnace) and secondary air V3 flowing between ducts D5 and D6 (which is fed directly to the boiler furnace through a wind box attached to the outside thereof). The heat exchange elements are normally of two types one upper ("hot end") layer for the hot end of the rotor 2 to maximize heat exchange adjacent, typically disposed above, and another lower ("cold end") layer to minimize fouling (which occurs at the lower temperatures experienced at the cold end of rotor 2). In combination, the heat exchange elements are designed to transfer a maximum amount of preheat while still operating at temperatures which inhibit or avoid fouling, oxidation and/or acid corrosion, for example. Typically, primary air V2 amounts to about 20% of the combustion air and contains about 10% of heat captured from flue gas V1 while secondary air V3 is about 80% of combustion air containing 90% of heat captured.

Looking at the rotor 2 as illustrated in FIG. 1 it will be appreciated that at any given time there is a "flue gas" portion intermediate flue gas ducts D1 and D2, a "primary air" portion intermediate primary air ducts D3 and D4 and a "secondary air" portion intermediate secondary air ducts D5 and D6. The flue gas V1 with a volumetric flow rate of V1 exits its inlet duct D1 at a flue gas inlet temperature of T1 adjacent the hot end of the "flue gas" sector of rotor 2 and enters its outlet duct D2 at a lower flue gas outlet temperature of T2 adjacent the cold end of that sector. Oppositely, primary air V2 with a volumetric flow rate of V2 exits its inlet duct D3 at an air inlet temperature of T3 (typically around the prevailing ambient air temperature) adjacent the cold end of the "primary air" sector of rotor 2 and enters its outlet duct D4 at a primary air outlet temperature of T4 adjacent the cold end of that sector. Likewise, secondary air V3 having a volumetric flow rate of V3 exits its inlet duct D5 at about the same air inlet temperature T3 and enters its outlet duct D6 at a secondary air outlet temperature of T5 adjacent the cold end of that sector. The temperature of the rotor 2 itself will vary between a high hot end metal temperature T6 at its hot end when immediately adjacent the flue gas inlet duct D1 and a low cold end metal temperature T7 at its cold end when immediately adjacent the secondary air outlet duct D6. These temperatures can be measured or estimated utilizing local sensors or otherwise in known fashion.

In a typical trisector APH configuration these ducts are arranged with a "G-P-S" configuration, a "forward" rotation APH, where in the direction of rotation of rotor 2, G being the flue gas ducts is followed by P being the primary air ducts which is trailed by S being the secondary air ducts, i.e. any given radial portion of the rotor 2 rotates between the flue gas ducts D1-D2, then the primary air ducts D3-D4, and finally the secondary air ducts D5-D6, so that primary air is preheated before secondary air, repeating the process at a rate of about 1 revolution per minute. In a "G-S-P" configuration (or "reverse" rotation APH) it will be readily understood that the secondary air is preheated before the primary air.

During normal operation, the volumetric flow rate values of V1, V2 and V3 will each vary between a respective minimum when the boiler is operating at low load and a maximum when it is operating under full load conditions. These volumetric flows are also in part controlled by operation of fans (e.g., fan 600) in respective ducting variously upstream and/or downstream of the APH and in particular, primary air fan and secondary air fans are employed. Fan operation can be affected and controlled to increase and/or maintain flows to compensate for pressure drops inherent in ducting and/or pollution controls equipment such as the APH, for example. Also, primary air fan and secondary air fan operation is controlled differentially for primary air V2 and secondary air V3 so that the former is raised to a higher pressure to facilitate transport of pulverized coal from mills to furnace, for example. Typically, secondary air V3 has a pressure of 10-30 in inches wg and primary air V2 has a pressure of 40-60 in inches wg. One result of such higher pressure is that primary air V2 has a higher heat of compression as compared to secondary air V3 observable in part as T4 typically being higher than T5.

Generally speaking, except as later described, the air inlet temperature T3S will remain essentially constant at or near the prevailing ambient and/or local air temperature T3 whereas primary air inlet temperature T3P is somewhat higher than secondary air inlet temperature T3S (e.g. by about 20 degrees Fahrenheit) by virtue of the additional compression caused by the primary air fan or primary air booster fan (if the latter is used in conjunction with the secondary air fan to blow primary air through the APH). However, the other temperatures T will vary between respective minimum and maximum dependent on boiler load and attendant volumetric flow. There is a practical minimum for the average cold end temperature T7, namely it should be at or above an industry established norm based on the characteristics of the boiler fuel to mitigate against acid corrosion, for example. The average cold-end temperature (ACET) is the average of the air inlet and gas outlet temps. It will be understood that this average is achieved even when during rotation the actual cold metal temperature T7 is in fact below the acid dewpoint, although it is better for ACET to be for the most part above the dewpoint.

Also, there is a practical maximum for the primary air outlet temperature T4 because the primary air must have a mills inlet temperature T8 (not shown) below a given maximum (being that at which auto-ignition of the coal particulates might occur outside the furnace leading to coal mills fires and operation of fire suppression equipment). That said, there is also a practical minimum for mills inlet temperature T8 related to the moisture content of the pulverized coal especially relevant for high moisture lignite or brown coals. It will be appreciated that a coal particulate cannot be burnt efficiently if still wet so they must be dried to some extent. This could be done within the furnace but that would reduce overall efficiency thereof, hence it is preferable that moist particles are substantially dried by the primary air prior to being fed into the furnace, i.e. using preheat from flue gas or fan operation (e.g., fan 600). This is one reason why T3P being higher than T3S is a desirable condition.

Typically, T8 is not measured but instead the primary air outlet temperature T10 (not shown) is controlled and primary air flow is tempered to have a temperature between $T10_{MIN}$ (facilitating appropriate coal drying) and $T10_{MAX}$ (ensuring no coal auto-ignition in the mills). Various means of primary air tempering (i.e., changing temperature of air) is disclosed in U.S. Pat. No. 3,373,520 (Hottenstine) and U.S. Pat. No. 4,442,783 (Pajonas et al). Tempering air includes, but is not limited to conditioning or changing the temperature of air, i.e., cooling or heating, through tempering means including, e.g., a fan, a bath, a cooling system, a heating system, the addition of different-temperature air.

It will be understood that principal purpose of any APH is to improve boiler efficiency by scavenging heat from flue gas to preheat combustion air thus reducing the amount of waste heat exhausted to atmosphere and effectively reducing the amount of fuel required to heat the furnace. Thus, the generally accepted goal of APH design has been improve its own efficiency of heat transfer by maximising the heat captured for secondary combustion air preheat consequently minimizing the flue gas outlet temperature, e.g. T2 while maintaining the cold metal temperature T7 above the required minimum.

Practically speaking for any given boiler load there is a fixed volumetric flow rate (possibly also mass flow rate) required for combustion air, e.g. V2+V3 and thus only so much preheat required resulting in at moderate loads a flue gas outlet temperature T2 higher than might otherwise be achievable with the increased flue gas flow inherent during peak load conditions. In such circumstances it has been found that the flue gas outlet temperature T2 achieved has been too high for efficient operation of Electrostatic Precipitators (ESPs) (not shown) disposed immediately downstream of the APH to capture particulate pollutants from the flue gas such as fly ash, for example. To overcome this U.S. Pat. No. 6,089,023, proposed over feeding the APH with volumes of air in excess of that needed as combustion air and then bleeding off the 'unwanted' excess air upstream of the APH, e.g. from the secondary air outlet duct D6 (for other uses or simply dumped to atmosphere), thus providing an acceptably lower flue gas outlet temperature e.g. T2 (a so called "overfeed technology"). It will be understood the unwanted excess air, when vented to the atmosphere while maintaining desirably low flue gas outlet temperature, e.g. T2, is in fact waste heat which thus reduces the operational efficiency of the APH and boiler.

Recently there has arisen a need to operate boilers with zero water discharge thus avoiding the need for water treatment plants to remove pollutants before discharging wastewater into the environment. It is known to dispose an evaporative system such as a spray dryer absorber (SDA). As later described other such evaporative systems include, for example, circulating dry scrubber (CDS) and all such are operative to evaporate wastewater in order to reduce or eliminate water discharge. These systems are fed with flue gas exiting the APH either directly or further downstream of other pollution control equipment. This is not problematic at high loads as the flue gas outlet temperature at such design loads, e.g. T2 and volumetric flow V1 are sufficiently high to facilitate full evaporation within the SDA for example, i.e. T2 is at the temperature T9 required for the particular volumetric flow V1 to facilitate near 100% evaporation. It will be appreciated that there is a need to maintain T2≥T9 otherwise SDA will not be fully effective for zero water discharge and remaining water will need to be treated by the very waste water treatment equipment the SDA is intended to replace. It will be understood that SDA and CDS each evaporate water in known fashion which are in many respects similar.

Historically, coal-fired power stations were run at high loads/outputs even during power grid base load conditions and APH were optimized for such conditions and inherently T2≥T9 thus ideal for SDA operation. During moderate load conditions above 50% of full load flue gas outlet temperature T2 may inherently be too low for efficient SDA operation and thus there is a need to raise it to achieve zero water discharge. It is known to achieve the desired increase of T2≥T9 by heating secondary air before it enters the APH using a steam coil so that the APH air inlet temperature is well above that of the ambient temperature which in turn would increase the temperature T2 of flue gas exiting the APH 1. But such systems may still not achieve T2≥T9 themselves at normal load conditions and will not do so at low load conditions especially below 50% load, say 33% design load (a so called "steam coil technology"). Regardless of effectiveness it will be appreciated that steam coil technology is diverting heat from the boiler that might otherwise be used for power generation with an attendant reduction in boiler efficiency.

With the emergence of renewables in today's energy markets coal-fired steam generators (boilers) are often required to operate for extended periods of time at low loads (<50% of full load, e.g. typically at 33% design or full load). Many coal-fired boilers were not originally designed to operate in this mode; and for their installed APH low load operation often results in low or sub-optimal flue gas outlet temperatures T2 and low primary and secondary air outlet temperatures T4 and T5. As in such conditions, T2 is well below the value of T9 required for efficient SDA operation, i.e. typically to achieve at or near 100% wastewater evaporation, there is a need to raise the temperature of the flue gas exiting the APH and as before described the use of steam coil technology is not sufficient itself and wholly ineffective at low load conditions. Thus, it has been necessary to heat the flue gas above the temperature of that exiting the APH using a secondary heat source such as a natural gas or oil burner to achieve a flue gas temperature≥T9 for any given volumetric flow V1 (a so-called "secondary burner technology"). It will be appreciated that heating flue gas with any secondary burner technology downstream of the APH has a negative effect on boiler efficiency and it requires capital, fuel and maintenance costs to operate.

The Applicant, seeking to avoid the added costs of using secondary burner technology in such low load conditions (typically <50% of full load, e.g. 33% of design load), contemplated whether increased flue gas outlet temperature T2 could be achieved using the aforementioned overfeed technology and found that it could not. It will be appreciated from the above written assessment of these technologies that the only solution obvious from the state of the art would be to upgrade currently used steam coil technology with a much larger than usual steam coil, for example. Applicant believes the following described invention addresses the problems associated with the prior art and overcomes problems that would result from the obvious solutions and provides a novel and non-obvious solution.

SUMMARY OF THE INVENTION

It is an object of the invention to provide an APH temperature control system used to provide exiting flue gas at a temperature facilitating efficient operation of pollution control equipment and obviating any need to use secondary burner technology and/or steam coil technology at low boiler load conditions. In one embodiment, pollution control equipment may include water evaporative systems such as spray dry absorbers (SDAs), a circulating dry scrubber (CDS), or wet scrubbers (e.g., wet FGD). The present invention may allow for more reagent to be injected into the pollution control equipment, which improves removal efficiency. Pollution control equipment can benefit from higher gas inlet temperatures at low load, which improves water balance and reduced water treatment requirements.

It is further contemplated that the invention addresses problems associated with minimum operating temperatures. Additionally, the invention addresses problems associated with acid dewpoint and corrosion. It is contemplated that the invention addresses problems associated with sulfur dioxide ($SO_2$) removal efficiency, reagent utilization, and water balances.

In some embodiments of the invention it is contemplated that the invention results in less mass available for heat transfer, resulting in flue gas outlet temperature increase. Increase flue gas temperature to pollution control equipment has benefits depending on the system used, including, but not limited to, increasing the amount of process water and reducing the minimum load required to operate. In some embodiments of the invention it is further contemplated that the invention increases primary air temperature to mills, which increases coal drying and mill outlet temperature. In some embodiments of the invention, it is contemplated that APH gas outlet temperature is increased, increasing the average cold-end temperature. In some embodiments of the invention, it is contemplated that secondary bypass results in flue gas outlet temperature increase, increases APH gas outlet temperature, and increases acid dewpoint approach temperature.

The present invention includes a temperature control system for an air preheater. In one embodiment, the temperature control system includes a bisector air preheater (100) having a flue gas inlet duct (D1) configured for feeding flue gas from a boiler to the bisector air preheater (100), a flue gas outlet duct (D2) configured for discharging flue gas from the bisector air preheater (100), a combustion air inlet duct (D50) configured for conveying air to the bisector air preheater (100), a combustion air outlet duct (D100) configured for discharging air from the bisector air preheater (100), the combustion air outlet duct (D100) in fluid communication with a primary air duct (D40) and a secondary air duct (D60), the secondary air duct (D60) downstream of the primary air duct (D40), the primary air duct (D40) being configured for feeding a first amount of primary air (V20) to the boiler via at least one pulverizing mill and the secondary air duct (D60) being configured for feeding a second amount of secondary air (V30) directly to the boiler, a heat exchange rotor (20) having a hot end proximate the flue gas inlet duct (D1) and a cold end proximate the combustion air inlet duct (D50), the amount of the secondary air (V30) is larger than the amount of the primary air (V20), and an air preheater-bypass duct (D70) in communication with the combustion air inlet duct (D50) and the secondary air duct (D60), the air preheater-bypass duct (D70) configured to bleed a portion of the combustion air (V300) as secondary air bypass (V40) from the air inlet duct (D50) upstream of the bisector air preheater (100) for reintroduction downstream into the secondary air duct (D60), and a flow control device (DV10) for controlling volumetric flow of the secondary air bypass (V40) and tempering primary air flow (V20), the primary air flow (V20) configured to maintain the flue gas outlet temperature (T2) at or above a first predetermined minimum temperature (T9) for a flue gas volumetric flow (V1) exiting the bisector air preheater (100) alone or in conjunction with other tempering means to maintain a primary air outlet temperature (T10) within a safety range of a minimum temperature required to facilitate coal drying in the pulverizing mill ($T10_{MIN}$) to a maximum temperature that would lead to auto-ignition of coal in the pulverizing mill ($T10_{MAX}$).

In one embodiment, the temperature control system includes a trisector air preheater (1) having a flue gas inlet duct (D1) configured for feeding flue gas from a boiler to the trisector air preheater (1), a flue gas outlet duct (D2) configured for discharging flue gas from the trisector air preheater (1), a primary air inlet duct (D3) configured for providing primary air (V2) to the trisector air preheater (1), a primary air outlet duct (D4) configured for feeding a first amount of primary air (V2) to the boiler via at least one pulverizing mill, a secondary air inlet duct (D5) configured for feeding a secondary air (V3) to the trisector air preheater (1), a secondary air outlet duct (D6) configured for feeding a second amount of secondary air (V3) direct to the boiler, a heat exchange rotor (2) having a hot end proximate the gas inlet duct (D1) and a cold end proximate the secondary air inlet duct (D5), at least a secondary air bypass duct (D7) in communication with the secondary air inlet duct (D5) and the secondary air outlet duct (D6), the secondary air bypass duct (D7) configured to bleed a portion of the secondary air (V3) as secondary air bypass (V4) from the secondary air inlet duct (D5) upstream of the trisector air preheater (1) for reintroduction downstream into the secondary air outlet duct (D6), and a flow control device (DV1) for controlling volumetric flow of the secondary air bypass (V4) and tempering primary air flow (V2), the primary air flow (V2) configured to maintain the flue gas outlet temperature (T2) at or above a second minimum temperature (T9) for the flue gas volumetric flow (V1) exiting the trisector air preheater (1) to maintain primary air outlet temperature (T10) within a safety range of a minimum temperature required to facilitate coal drying in the pulverizing mill ($T10_{MIN}$) to a maximum temperature that would lead to auto-ignition of coal in the pulverizing mill ($T10_{MAX}$).

In some embodiments, when the air preheater is the trisector air preheater (1), the control system further includes a primary air bypass duct (D8) in communication with the primary air inlet duct (D3) and the primary air outlet duct (D4), the primary air bypass duct (D8) configured to bleed a portion of the primary air (V2) as primary air bypass (V5) from the primary air inlet duct (D3) upstream the trisector air preheater (1) for reintroduction downstream into the primary air outlet duct (D4), and a second flow control device (DV2) for controlling volumetric flow of the primary air bypass (V5).

In some embodiments, when the air preheater is the bisector air preheater (100), the secondary air bypass (V40) at low load conditions is between 5 to 15% of the secondary air (V30) fed to the bisector air preheater (100).

In some embodiments, when the air preheater is the trisector air preheater (1), the secondary air bypass (V4) at low load conditions is between 5 to 15% of the secondary air (V3) fed to the trisector air preheater (1).

In some embodiments, when the air preheater is the trisector air preheater (1), the primary air bypass (V5) at low load conditions is between 15 to 20% of the primary air (V2) fed to the trisector air preheater (1).

In some embodiments, when the air preheater is the trisector air preheater (1), at low load conditions the secondary air bypass (V4) is 10% and the primary air bypass (V5) is 20%.

In some embodiments, when the air preheater is the bisector air preheater (100), the first predetermined minimum temperature (T9) is configured to facilitate efficient operation of pollution control equipment positioned downstream of the bisector air preheater (100) to receive flue gas flow (V1) exiting flue gas outlet duct (D2).

In some embodiments, when the air preheater is the trisector air preheater (1), the second predetermined minimum temperature (T9) is configured to facilitate efficient operation of pollution control equipment positioned downstream of the trisector air preheater (1) to receive flue gas flow (V1) exiting flue gas outlet duct (D2).

In some embodiments, the pollution control equipment is a spray dryer absorber (SDA), a circulating dry scrubber (CDS) or a wet flue gas desulfurization system ("FGD"). In some embodiments, the pollution control equipment is positioned to receive at least a first portion of the flue gas flow (V1) immediately downstream of the trisector air preheater (1) or the bisector air preheater (100), thereby resulting in an increase in wastewater evaporation.

In some embodiments, when the flue gas volumetric flow (V1) is at or above the predetermined minimum temperature (T9) at low load conditions, the at least first portion of the flue gas flow (V1) to evaporate wastewater fed into the pollution control system.

In some embodiments, at least one of the secondary air bypass (V4) is pressure drop assisted and the primary air bypass (V5) is pressure drop assisted. As one skilled in the art will recognize, in some embodiments disclosed herein, pressure drop assistance is provided by, e.g., the opening of ducts, passageways, and the like, to move a volume of air.

In some embodiments, the pulverizing mill (400) includes a pulverizer inlet for receiving fuel and a pulverizer outlet for discharging pulverized fuel therefrom; and the boiler (500) in communication with the pulverizer outlet, the boiler being configured to combust the fuel. In some embodiments, each of the bisector air preheater (100) and the trisector air preheater (1) include: a rotor (20) mounted for rotation on a spindle; and a plurality of heat transfer elements disposed therein, the heat transfer elements being configured to transfer heat to a gas flowing thereby, each of the bisector air preheater (100) and the trisector air preheater (1) defining a hot-end (20H) and a cold-end (20C).

In some embodiments, the combustion air outlet duct (D100) branches into the primary air duct (D40) and the secondary air duct (D60), and the primary air duct (D40) is smaller than the secondary air duct (D60). The present invention is directed to a method of controlling temperatures of gases exiting an air preheater utilizing a temperature control system in accordance with any of the foregoing embodiments.

The present invention is directed to a method of retrofitting an air preheater installation with a temperature control system in accordance with any of the foregoing embodiments wherein the air preheater is the trisector air preheater (1). In some embodiments, the method includes utilizing a pre-existing primary air bypass duct (D8) throttled with a pre-existing damper valve (DV2); and installing an appropriately sized secondary air bypass duct (D7) closable with damper valve (DV1), wherein during low load operation, upon opening of the damper valve (DV1) and full opening of the damper valve (DV2) the primary air outlet temperature (T4) is increased by a predetermined amount sufficient to raise primary air outlet temperature (T10) to at least a minimum primary air outlet temperature ($T10_{MIN}$).

In some embodiments of the retrofit method, 10 to 20% of the primary air flowing into the trisector air preheater (1) is bypassed and the secondary air bypass duct (D7) can bypass in the order of 0 to 10% of the secondary air flowing into the trisector air preheater (1).

The foregoing embodiments, and others, are described in more detail herein.

BRIEF DESCRIPTION OF THE DRAWINGS

The following figures depict certain aspects and embodiments of the invention, but do not limit the invention to what is shown and described in the figures.

DETAILED DESCRIPTION

Figure 1:
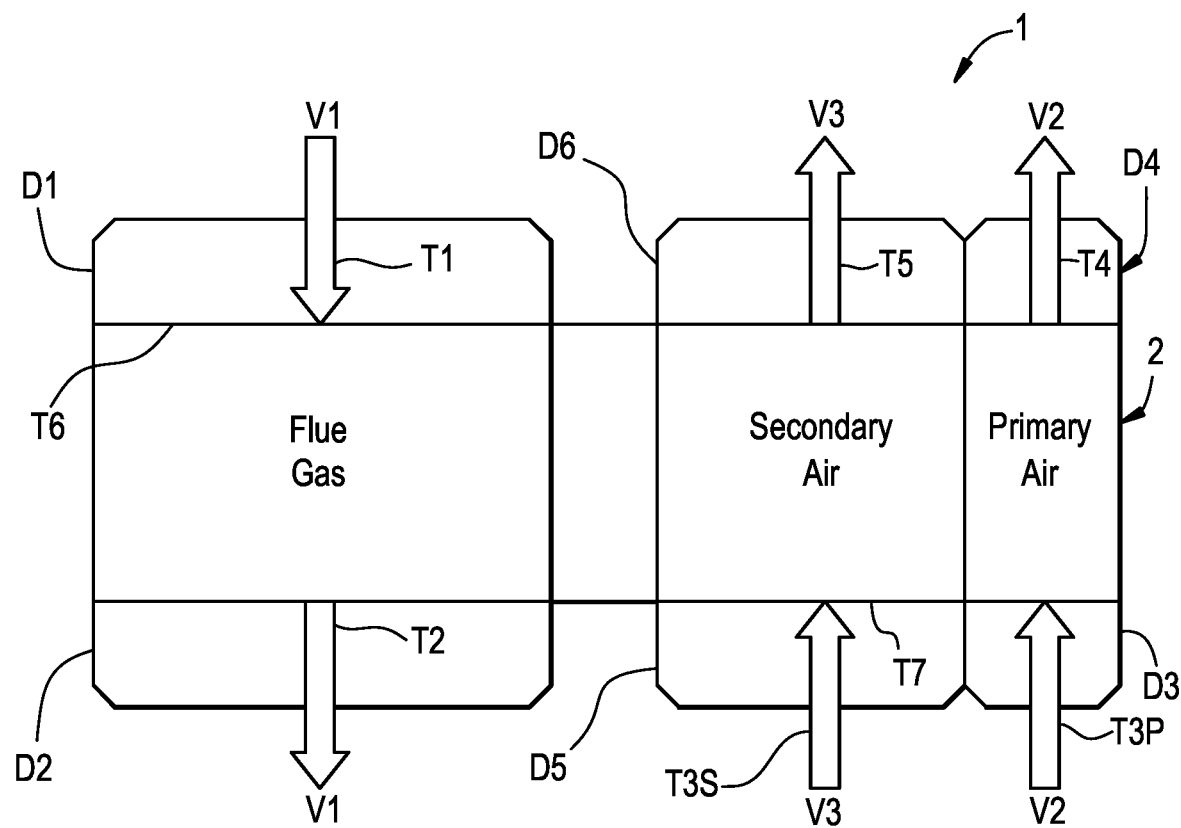
FIG. 1 shows a diagrammatic illustration of a trisector air preheater according to the prior art.
Figure 2:
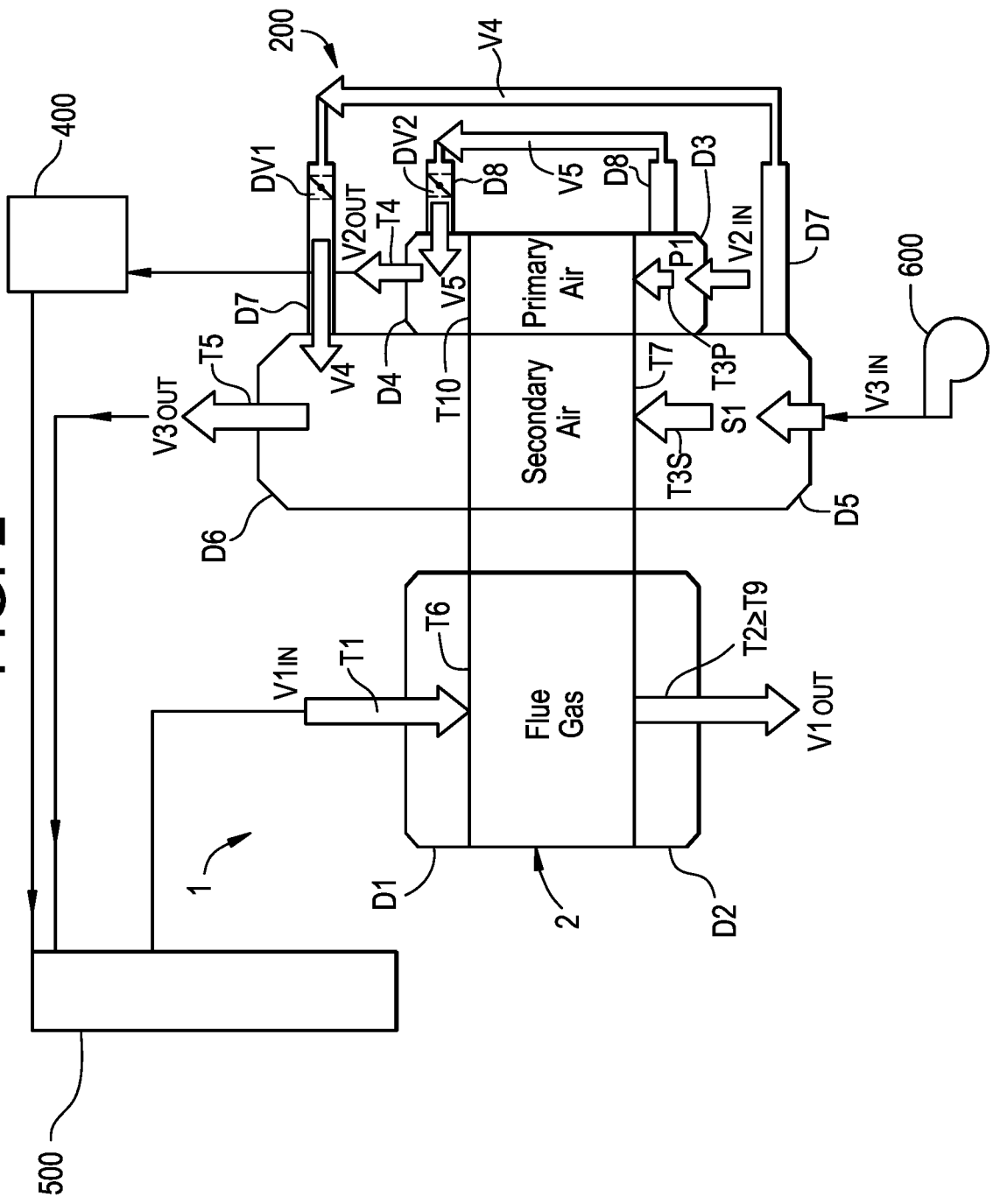
FIG. 2 shows a diagrammatic illustration of a trisector air preheater together with a temperature control system in accordance with an embodiment of the invention.

FIG. 2 illustrates an APH 1 similar to FIG. 1 with like features being indicated with identical or like alphanumeric notation. In FIG. 2, the APH 1 is a trisector APH for use with a coal fired boiler (not shown) which uses flue gas V1 to preheat combustion air (V2+V3) fed to the boiler. The combustion air is in part primary air V2, which first passes through at least one coal mill or pulverizer (not shown) to carry coal particulates into the boiler's furnace. The remainder of the combustion air is fed directly from APH 1 to the furnace as secondary air V3. Additionally, flue gas V1 exiting the APH 1 is fed directly to pollution control equipment (not shown). Pollution control equipment, in one embodiment is a water evaporative system. Water evaporative systems include a spray dryer absorber ("SDA"), a circulating dry scrubber ("CDS"), or a wet flue gas desulfurization system ("FGD") to evaporate wastewater in order to reduce or eliminate water discharge. The evaporative system will for ease of description henceforth be referred to as an SDA. Other pollution control equipment may be utilized.

For ease of comprehension, the various gas flows are variously denoted V1 to V5 with the same referring interchangeably with volumetric and mass flow rates. While it is easier to think about the various volumes of gas flowing, the mass composition thereof is important when calculating actual prevailing flows and the thermal and/or combustion-supporting characteristics thereof.

The trisector APH 1 in FIG. 2 is provided at its upper/hot end and disposed 'circumferentially' around its rotor 2: a flue gas inlet duct D1, a primary air outlet duct D4 and a secondary air outlet duct D6, with each being axially aligned respectively with: a flue gas outlet duct D2, a primary air inlet duct D3 and a secondary air inlet duct D5 disposed similarly around the rotor 2 at its lower/cold end. For ease of illustration and functional explanation, the primary and secondary air ducts are illustrated as being radially disposed.

The rotor 2 houses baskets of element profiles designed as they rotate to extract heat from flue gas V1 exiting inlet duct D1 and to liberate same to preheat the combustion air entering respectively primary air outlet duct D4 and secondary air outlet duct D6. This is accomplished by the heating of a "flue gas" portion of rotor 2 by hot flue gas passing therethrough resulting in preheating of combustion air for the boiler furnace passing variously through a "primary air" portion of rotor 2 as primary air and through a "secondary air" portion as secondary air. What is not shown are the various electrical and/or mechanical control system(s), fans/blowers, external ducting, pressure transducers and temperature gauges, damping devices typically utilized to operate APH, and boiler furnace and its wind box. Such ancillary equipment is well known in the field. The functionality and operational limitations of such ancillary equipment, including the inherent issues relating to leakage, is well known and consequently the ordinary design, engineering, installation and operation of the previously described known aspects of the trisector APH is not described in the detail known to the skilled experts in the field.

The flue gas with a volumetric flow rate of V1 (flue gas V1) exits its inlet duct D1 at a flue gas inlet temperature of T1 adjacent the hot end of rotor 2 and enters its outlet duct D2 at a lower flue gas outlet temperature of T2 adjacent the cold end of rotor 2. Oppositely, primary air with a volumetric flow rate of V2 (primary air V2) exits its inlet duct D3 at a primary air inlet temperature of T3P adjacent the cold end of rotor 2 and exits its outlet duct D4 at a primary air outlet temperature of T4. Likewise, secondary air having a volumetric flow rate of V3 (secondary air V3) exits its inlet duct D5 at a secondary air inlet temperature T3S and exits its outlet duct D6 at a secondary air outlet temperature of T5 adjacent the cold end of that sector. The temperature of the rotor 2 itself will vary between a hot end metal temperature T6 achieved at its hot end and a cold end metal temperature T7 achieved at its cold end.

To facilitate highly efficient SDA operation, i.e. at or near 100% wastewater evaporation, at any given time during typical operation under any given load condition, flue gas V1 exiting the flue gas outlet duct D2 must maintain a temperature of T2≥T9 for the reasons aforedescribed. To facilitate this, the trisector air preheater 1 is installed together with a temperature control system 200 in accordance with one embodiment of the invention. The temperature control system 200 includes a secondary air bypass duct D7 extending between and in fluid communication with the secondary air inlet duct D5 and the secondary air outlet duct D6. The secondary air bypass duct D7 is configured to bypass up to a desired % of the volumetric flow of secondary air V3 at low load conditions.

In one embodiment, the temperature control system 200 includes a first flow control device DV1. The first flow control device DV1 may be an electrically or a pneumatically actuated first damper valve, a louvre control damper of known design, an electrical controller, or a pneumatic controller working in conjunction with the aforementioned ancillary equipment as appropriate. In one embodiment, at low load conditions, the secondary air bypass duct D7 is configured to facilitate secondary air bypass the desired % of between 5% and 20%, preferably 10% to 15%, of the volumetric flow or perhaps mass flow of secondary air V3.

The APH combustion air bypass according to the invention reduces the overall efficiency of the APH, and secondary air bypass increases the flue outlet temperature T2 when secondary air is bypassed at low load conditions. However, somewhat unexpectedly and counterintuitively, the decrease in secondary air outlet temperature T5 is accompanied by an increase in the primary air outlet temperature T4 indicating that despite the reduction in APH efficiency there is an increase in relative heat transfer to primary air flowing therethrough.

In some embodiments, to ensure primary air outlet temperature T4 is maintained within a range to ensure a primary air outlet temperature T10 is between the a minimum value $T10_{MIN}$ (required to facilitate appropriate coal drying) and a maximum value $T10_{MAX}$ (likely to lead to auto-ignition of coal in the mills), the primary air leaving the trisector APH 1 is tempered using known primary air bypass technology, or otherwise using overfeed technology, for example. Tempering air includes, but is not limited to conditioning or changing the temperature of air, i.e., cooling or heating, through tempering means including, e.g., a fan, a bath, a cooling system, a heating system, the addition of different-temperature air.

It is contemplated that the embodiment shown and described in FIG. 2 is a part of a retrofit project in which the trisector APH 1 is already fitted with existing primary air bypass technology. The present invention is not limited in this regard since in another embodiment, it is contemplated that the embodiment shown and described in FIG. 2 is part of a new project encompassing the trisector APH 1.

In the embodiment illustrated in FIG. 2, the temperature control system 200 of the invention further includes a primary air bypass duct D8 extending between and in fluid communication with the primary air inlet duct D3 and the primary air outlet duct D4, and a second flow control device DV2. The second flow control device DV2 is an electrically actuated damper valve or a pneumatically actuated damper valve. The primary air bypass duct D8 is adapted to bypass 10% of primary air flow V3 at design load conditions (e.g. where V3 is calculated from a 791450 lb/hr mass flow rate at 121 degrees Fahrenheit) and 20% at low load conditions of 33% (e.g. where V3 is calculated from 450510 lb/hr mass flow rate at 111 degrees Fahrenheit). In pre-retrofit conditions, the primary air outlet temperature T10 at low load conditions was below $T10_{MIN}$ resulting in inefficient coal drying prior to combustion, i.e. some required drying would occur in the furnace reducing efficiency thereof.

The inlet and outlet ducts D1 and D2, D3 and D4, D5 and D6 respectively are illustrated as each being a respective cowling of the trisector APH1 attached to its housing. However, it will be understood that these ducts as functionally described are intended to encompass not only such cowlings of the APH1, but also associated ducting leading therefrom. Thus, inlet ends of bypass ducts D7 and D8 communicate with the respective inlet ducts D5 and D3 either through the associated cowling of trisector APH 1 or through ducting extending upstream therefrom, and outlet ends of bypass ducts D7 and D8 communicate with the respective outlet ducts D6 and D4 either through the associated cowling of trisector APH 1 or through ducting extending downstream therefrom.

It will be understood that being packed with heat transfer elements, there is an inevitable pressure drop across the rotor 2 experienced by both flue gas and combustion air traversing axially therethrough. This in part is why ancillary equipment includes auxiliary fan(s) to maintain required volumetric flows, for example. It will be appreciated that the secondary air bypass duct D7 and the primary air bypass duct D8 when open, permit generally uninterrupted gaseous throughflow, resulting in a far lower pressure drop than that caused across the rotor 2 packed with heat transfer elements intended to cause interrupted flow and also often fouled with use. Consequently, these bypass ducts, when open, offer a preferred path for combustion air to flow resulting in what may be called pressure drop assisted bypass flow.

The air outlet end of the secondary air bypass duct D7 is conveniently proximate the APH 1 but it will be understood that it can be installed anywhere appropriate intermediate the APH 1 and the boiler's wind box (not shown). While the materials and dimensions of the secondary air bypass duct D7 are generally a matter of design choice, one example includes an abrasion resistant duct approximately 48 inches in diameter having a length of about 40 feet adapted in use to handle the volumetric flow of V4 as predicted in Table 2 below. The invention is not limited in this regard as other materials and dimensions are contemplated.

The aforedescribed is of an ideal situation in which there is no leakage from the "flue gas" path to the "combustion air" paths occur within the APH 1 whereas, in reality this is not the case which is why APH seals design remains important. In one installation, for example, the pressure-drop across the "flue gas" sector of rotor 2 may vary between 0.8 inches wg at low load to 3.6 inches wg at design load (depending on the configuration of elements packed in the rotor 2). The pressure-drop across the "primary air" sector similarly may vary between 0.7 and 2.15 inches wg and that across the "secondary air" sector between 0.5 and 2.8 inches wg. In all cases, the greater pressure-drop in the "flue gas" sector results in leakage into combustion air flowing through the rotor 2. So $V1_{IN} < V1_{OUT}$ and $V3_{OUT} > V3_{IN}$ resulting in said leakage varying between, for example, 8.56% at low load and 4.81% at design load.

The amount of secondary air bypass can be controlled not only by the sizing and length of the ducts D7 and D8 but also by appropriate actuation of the damper valves DV1 and DV2. The exact form of these valves is not of importance, but it should be appreciated that they could be replaced by fan assisted means where appropriate to provide the requisite bypass flow control function working together with the inherent pressure drop assist.

During high load operation (typically ≥50% of full load) of the boiler, the trisector APH 1 will operate with dampers DV1 and DV2 in a closed position, i.e. without any secondary air bypass beyond that associated with valve leakage, but permitting the 10% primary air bypass required to maintain the primary air outlet temperature T10 within the safety range $T10_{MIN}$ to $T10_{MAX}$. In this high load condition, the majority of secondary air V3 (also known as "combustion air") exiting secondary air outlet duct D7 is, apart from inherent leakage within the trisector APH 1, the same as the secondary air V3 entering the secondary air inlet duct D5 and the volumetric flow S1 of secondary air (secondary air S1) entering the secondary air section of rotor 2 is the same as that exiting duct D6 i.e. S1=V3. Similarly, the primary air V2 exiting primary air outlet duct D4 is substantially that entering primary air inlet duct D3 with about 10% flowing through the primary air bypass duct D8. The trisector APH 1 during high load operation does so without secondary air bypass operates in known fashion and is configured to provide a gas outlet temperature T2≥T9 and the desired highly efficient wastewater evaporation in the SDA, but with sufficient primary air bypass to ensure the primary air outlet temperature T10 stays within the desired safety range.

At low load operation (typically <50% of full load, e.g. 33% of design load) with damper DV1 closed and DV2 closed, i.e. without any secondary air bypass, the APH 1 will operate with a flue gas V1 output temperature T2<T9, i.e. insufficient for highly efficient operation of the SDA. However, by opening damper DV1 a portion V4 of the air V3 entering inlet duct D5 will flow through the secondary air bypass duct D7 thus bypassing the rotor 2 and more importantly decreasing the volumetric flow of secondary air S1 passing through the rotor 2. A reduced flow of secondary air S1 through the rotor 2 results in lower heat transfer by the installed element profiles resulting in an increased flue gas outlet temperature T2. It will be appreciated that by appropriate configuration of the secondary air bypass duct D7 and/or operation of the damper valve DV1, low load operation of the APH 1 with the secondary air bypass duct D7 at least mainly or indeed fully open can result in T2≥T9 and the desired efficient wastewater evaporation in the SDA. In any event the secondary combustion air V3=S1+V4.

During low load operation with secondary air bypass V4 only, i.e. with damper DV1 open and damper DV2 closed resulting in less waste heat extracted from the flue gas V1, the cold end metal temperature T7 of rotor 2 is 'increased' (as compared to similar operation with damper DV1 closed) and there is also an 'increase' in the primary air outlet temperature T10 at the hot end of the primary air section of rotor 2. This will result in the primary air V2 exiting the duct D4 having a higher outlet temperature T4 than when secondary air bypass duct D7 is closed. The extent to which this is a problem may depend in part on whether the trisector APH in question is a "forward" or "reverse" rotation APH and the precise configuration of heat transfer elements housed in the rotor 2. The precise mechanics and thermodynamics of such will not be further discussed here as it assumed to be readily understood by those skilled in the art.

As previously described, if T4 is too high it may lead to a coal mills primary air outlet temperature T10 approximating or exceeding the fire safe limit $T10_{MAX}$ therefor. In such circumstances there is a need to lower T10/T4 to below fire safe limits by fully opening DV2 to permit the existing approximately 20% maximum primary air bypass. However, secondary air bypass does fortuitously raise the primary air outlet temperature T4 and the amount of such bypass can be conditioned so that at low load conditions the primary air outlet temperature T10 is above $T10_{MIN}$, i.e. provides efficient coal drying not previously available at low load pre-retrofit. By limiting secondary air bypass appropriately, a desired increase in T4 at low loads can be achieved.

In the specific design described, it is found that a X=20% secondary air bypass will with 20% primary air bypass will result in Y=10 degrees increase in T4. Thus, it is possible to achieve a desired increase Y in flue gas outlet temperature T2 and a desired increase in primary air outlet temperature T4 by appropriate secondary air bypass percentage X. It will be understood that the achievable amount of secondary air bypass V4 without additional fan pressure or equipment is a function of the size, length, etc. of the ducting D7 and valve DV1 and it is within the competence of the skilled person to design accordingly for any given new or retrofit installation.

It will be appreciated that utilizing these embodiments facilitates the trisector APH 1 maintaining even at low loads the desired gas outlet temperatures. An example of indicative temperatures is to be found in FIG. 3 which relate to one specific design for an installation of an APH of "reverse" rotation G-S-P configuration and is not proscriptive of those to be found in other installations. The temperatures in brackets are those prevailing in such installation prior to retrofitting with embodiments of this invention and indicative of the temperatures achieved when secondary air bypass are installed but inoperative, i.e. with dampers DV1 closed during for example high load conditions. The temperatures (unbracketed) in degrees Fahrenheit are modelled predictively to be indicative of those achievable at low load when both secondary air bypass and primary air bypass are installed and operative with dampers DV1 and DV2 being fully open, i.e. there is in this case a desirable increase in the primary air temperature and the requisite increase in the flue gas outlet temperature needed for more efficient water evaporative system operation. Advantageously, there is also 10 degrees Fahrenheit increase in the primary air temperature which fortuitously raises primary air outlet temperature T10 into the desired range$\geq T10_{MIN}$. It will be understood that dampers DV1 and DV2 can be partially opened and closed depending on flue gas volumetric flow V1 and flue gas outlet temperature through the APH 1 to achieve temperatures between the bracketed and unbracketed values as desirable or required. As aforementioned the combustion air fans operation results in a higher heat of compression of primary air as compared to secondary air and thus results in the indicative temperatures of 574- and 570-degrees Fahrenheit (approximately 301 and 298 degrees Celsius), respectively.

Using any of these embodiments obviates the need for utilizing the aforedescribed secondary burner technology and/or the pumped air technology thus saving fuel, capex and/or maintenance costs of ancillary equipment they require. Indeed, if one of these embodiments were not used, then it would be necessary at least to use a less efficient APH to provide the required flue gas outlet temperature T2 at low load conditions, and/or reheat the flue gas to a temperature entering the SDA greater or equal to T9. Such reheat would be achievable with secondary burner technology and/or using a larger steam coil when utilizing steam coil technology.

It will be understood that the aforementioned embodiments described in relation to zero water discharge from a wastewater evaporative system such as an SDA may technically be more aspirational than achievable, particularly in relation to existing boiler installations. Thus, while avoiding the need for water treatment plants to remove pollutants before discharging wastewater into the environment is a laudable goal, it is possible that there is some wastewater discharge from that system. When zero water discharge is not achieved, it will be understood that the cost of water treatment is a function of volume of wastewater treated. So even if the invention facilitates a reduction in the water discharged, it will result in the consequent reduction of wastewater treatment cost roughly in proportion to the excess water evaporation in the evaporative system facilitated by its use.

Secondary air bypass V4 and/or primary air bypass V5 during low load operation of the APH 1 inevitably leads to less heat recovery from the APH and less efficient use of coal, resulting in a coal cost therefor. To mitigate any reduction in low load boiler efficiency the APH 1 can be of improved air preheater design, such as that described in Applicant's various current patent applications relating to its advanced profile elements designs and its AdvX® Technologies, i.e. which operate with greater heat exchange efficiency at both low and high load conditions.

The invention has been described relating to conditioning the flue gas outlet temperature T2 exiting the APH 1 using secondary air bypass V4 to ensure more efficient operation of the immediately downstream water evaporation equipment e.g. SDA. It will readily be understood that in fact it is the flue gas temperature entering the water evaporation equipment that is critical. Indeed, it could be that the invention is used in relation to other pollution control equipment downstream of the APH and to condition flue gas inlet temperature into that equipment. Also, it could be that there is equipment intermediate the APH and the pollution equipment control equipment for which the invention is utilized to condition its flue gas inlet temperature. The aforementioned description of the embodiments is thus illustrative of and not restrictive of applications of the invention and the conditioned temperature T9 will be sufficient to maintain flue gas inlet to the pollution control equipment temperature at required levels to facilitate more efficient operation thereof.

As an example, embodiments of the invention may be installed when retrofitting a boiler installation while also leaving an existing steam coil operative and in place immediately upstream of the APH. The coal cost of secondary air bypass V4 may in fact be greater than for example the steam cost associated with using the already installed steam coil to preheat combustion air entering the APH which in turn increases the temperature of the flue gas V1 exiting the APH. Thus, in a further embodiment of the invention (not illustrated) there is provided a steam coil intermediate combustion air fans and the APH which being upstream of the APH will increase the temperature of the flue gas flow V1 by increasing the temperature of the combustion air V3. In such an embodiment, it will be understood that the critical temperature T9 required for efficient evaporative system operation is to be measured with the steam coil in service and thus the secondary air bypass V4 is operative effectively to facilitate raising of the temperature T2 of the flue gas V1 downstream of the APH 1 additional to that facilitated by the steam coil operating at or near its maximum.

One retrofit example has been modelled and predictive performance at full load (i.e. secondary air bypass inoperative) is detailed in Table 1. The predictive performance at low load (i.e. 33% design load) is detailed in Table 2 which includes a column of the trisector APH1 prior to retrofit with secondary air bypass and Applicant's latest generation advanced element profiles TF4™ (as disclosed in PCT/US2016/069186) and DN8™ (as disclosed in PCT/US2016/056209). Operational features of the invention have been described generally with information extrapolated from the Tables 1 and 2 and it will be understood that more detailed information can be extracted therefrom both by way of explanation and/or technical limitation of the invention(s) as claimed. Additionally, the Tables 1 and 2 may be annotated with reference numerals in the drawings or read in conjunction therewith by way of illustrative example only without limiting their actual predictive merit or import.

Figure 3:
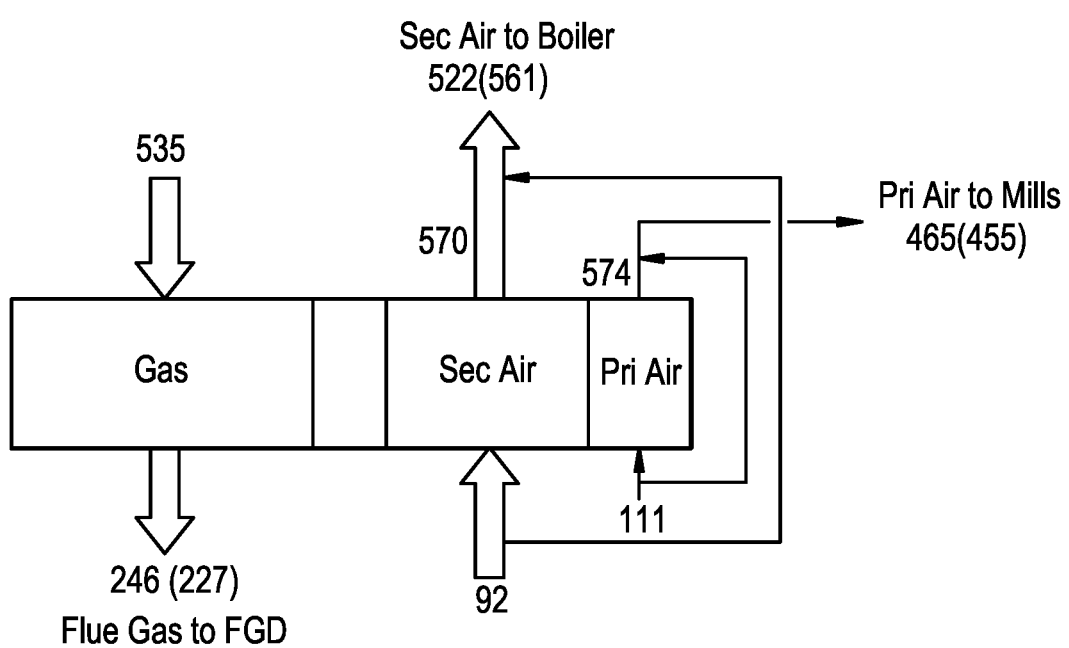
FIG. 3 shows the diagrammatic illustration of the trisector air preheater of FIG. 2 being a "reverse" rotation G-S-P configuration with representative temperatures achievable during operation of one specific design of that embodiment.
Figure 4:
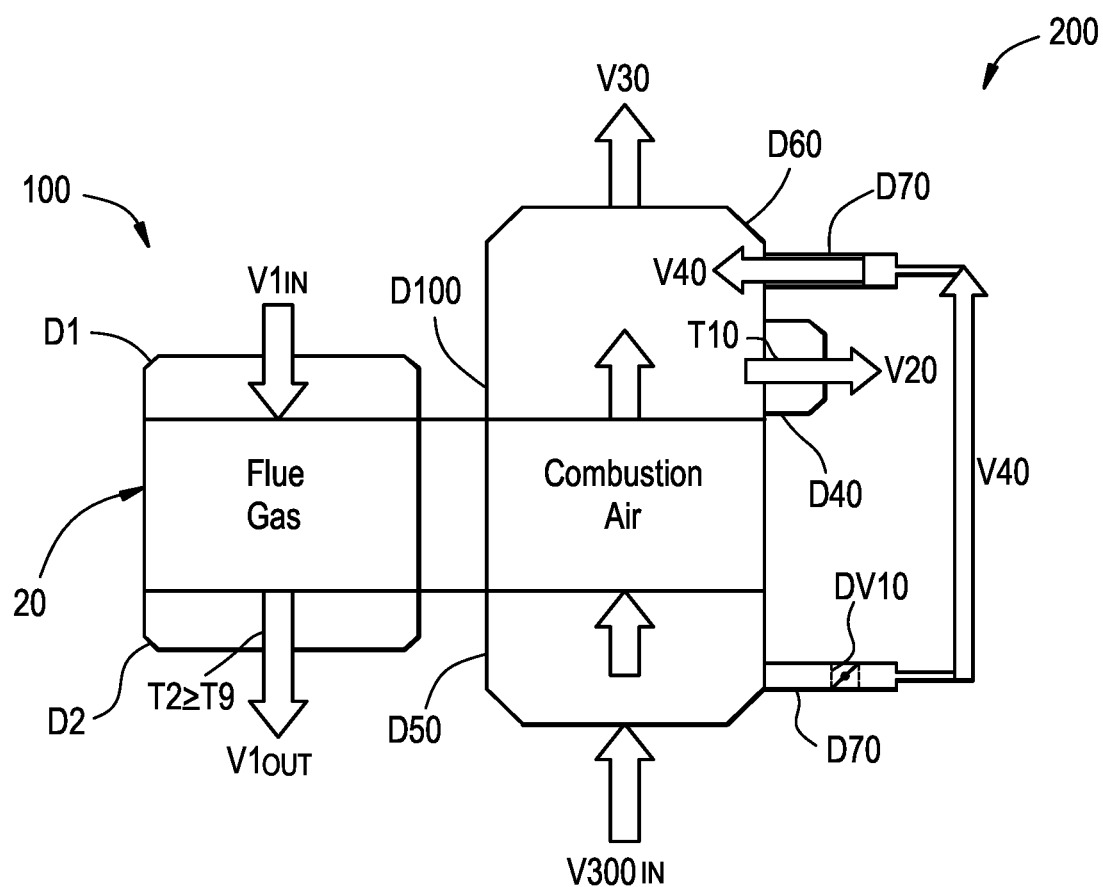
FIG. 4 shows a diagrammatic illustration of a bisector air preheater in accordance with a further embodiment of the invention.

In another embodiment of the invention, a bisector APH 100 illustrated in FIG. 4 has a temperature control system 200 having combustion air bypass configured to minimally affect mills inlet temperature T8. It will be understood that in a bisector APH 100 there are only two gas paths, namely a hot flue gas path (as in trisector APH 1) adjacent and in contraflow to a second combustion air preheat path. Downstream of the bisector APH 100, the preheated combustion air flow diverges at the same temperature into a primary air duct and a secondary air duct. The nature, condition, use and operational constraints of various gas flows are the same for bisector APH 100 as for trisector APH 1. Hence, in FIG. 4, like features to those of trisector APH 1 illustrated in FIGS. 1 to 3 are denoted with like numerals and similar features are denoted by decimal multiples thereof.

The bisector APH 100 has a rotor 20 having a flue gas path for volumetric flow V1 and a combustion air preheat path with a combustion air inlet volumetric flow V300. The bisector APH 100 has a flue gas inlet duct D1, a flue gas outlet duct D2, a combustion air inlet duct D50 and a combustion air outlet duct D100. Flue gas flows through the rotor 20 liberating waste-heat thereto between flue gas ducts D1 and D2 and combustion air is preheated by rotor 20 as it flows between ducts D50 and D100. Downstream of the bisector APH 100 the combustion air outlet duct D100 branches into a smaller branch or primary air duct D40 feeding a first smaller portion of the combustion air as primary air V20 to coal mills (not shown) and a larger branch or secondary air duct D60 feeding a second larger portion of combustion air as secondary air V30 direct to a boiler (not shown). It will be understood that combustion air entering the primary air duct D40 and the secondary air duct D60 will be at the same temperature and pressure which will be a function of the efficiency of the APH 100 and boiler load. It is desirable still to maintain a primary air outlet temperature T10 within a safety range of a minimum temperature required to facilitate coal drying in the pulverizing mill ($T10_{MIN}$) to a maximum temperature that would lead to auto-ignition of coal in the pulverizing mill ($T10_{MAX}$). At low load conditions, it is desirable to maintain the flue gas outlet temperature T2 greater or equal to T9. Consequently, in accordance with the invention, the bisector APH 100 is provided with a secondary air bypass duct D70 (also referred to herein as an" air preheater-bypass duct D70") connecting fluidically the combustion air inlet duct D50 to the secondary air duct D60 having a damper valve DV10 operable to permit secondary air bypass flow V40 in the order of magnitude as hitherto described for trisector APH 1.

As previously explained, any combustion air bypass will reduce the efficiency of bisector APH 100 fortuitously raising flue gas outlet temperature T2 but lowering the combustion air preheat. Porting combustion air bypass V40 into the secondary air outlet duct D60 (and not simply into the combustion air outlet duct D100) effectively isolates the primary air flow V20 from the temperature lowering effects concomitant with mixing cold bypassed combustion air with the already preheated secondary air. Thus, by appropriate operation of the damper valve DV10 it is possible to in effect temper the primary air V20 temperature in order to maintain a primary air outlet temperature T10 within a safety range $T10_{MIN}$ to $T10_{MAX}$, or at least very much closer to $T10_{MIN}$ than would have been the case without such isolation. While a simple embodiment for a bisector APH100 is described, it will be understood that other primary air tempering (i.e., air temperature adjustment) means might be employed additionally or in place of the tempering afforded by the aforementioned isolation to achieve the goal of a suitable primary air outlet temperature T10.

In a further embodiment of the invention (not shown), there is provided two APH being a smaller primary APH (feeding primary air to mills) and a larger secondary APH (feeding secondary air direct to the boiler furnace). In a yet further embodiment suitable for oil-fired boilers, there is a single large APH feeding preheated combustion air direct to the furnace. In both embodiments, there is provided a combustion or secondary air bypass as previously described and the originally installed APH are retrofitted with improved heating elements profiles having heat transfer characteristics equivalent to our better than Applicant's DN8™ and/or TF4™ elements. As compared to pre-installed APH, the retrofitted APH using in whole or in part the improved profiles, when secondary or combustion air bypass is in operation in low load conditions demonstrate reduced efficiency and desired increase in flue outlet temperature. Advantageously, and similarly as compared to the pre-installed APH, there is an effective increase in ACET which provides an unexpected bonus in not exacerbating cold-end corrosion that the pre-installed APH are prone to at low load conditions. At high or design load conditions as previously described, the improved APH operate more efficiently heat transfer wise than the pre-installed APH. Somewhat counterintuitively, despite the decrease in APH efficiency anticipated using combustion or secondary air bypass at low load, the overall energy recovery facilitated by the improved APH operating or cycling between high and low load conditions is in fact greater than can be facilitated by an improved APH operating without air bypass in similar situations.

This further embodiment will be discussed with reference to secondary air flow information from Tables 1 and 2 which information, while modelled in relation to a trisector APH also having primary air flow, holds true for a bisector APH for secondary air only or for one used with oil-fired boilers which preheats all combustion air (as such being absent coal mills there is no need for primary air). Embedded in these tables is information on compensation calculations pertaining to low load penalty, high load gain and recovery where:

Low Load Penalty=specific heat of air*secondary air flow at low load*(mixed secondary air temperature with bypass−leaving secondary air temperature no bypass)

Secondary air flow at low load=$SA_{LO}$

Mixed secondary air temperature with bypass (improved or not improved with heating elements)=$T_{MIXED}$ Leaving secondary air temperature without improved elements=$T_{NO\ BYPASS}$ Specific heat of air=$cp_{AIR}$ Low Load Penalty=$cp_{AIR} * SA_{LO} * (T_{MIXED} - T_{NO\ BYPASS})$ High Load Gain=specific heat of air*secondary air flow at high load*(leaving secondary air temperature without improved element−leaving secondary air temperature with improved element)

Secondary air flow at high load=$SA_{HIGH}$

Leaving secondary air temperature without improved element=$T_{STANDARD}$

Leaving secondary air temperature with improved elements=$T_{IMPROVED}$

Specific heat of air=$CD_{AIR}$

High Load Gain=$CD_{AIR} * SA_{HIGH} * (T_{IMPROVED} - T_{STANDARD})$

Recovery Factor=Low Load Penalty/High Load Gain

Recovery Factor=$CD_{AIR} * SA_{LO} * (T_{MIXED} - T_{NO\ BYPASS}) / CD_{AIR} * SA_{HIGH} * (T_{IMPROVED}\ T_{STANDARD})$ Recovery Factor=$SA_{LO}/SA_{HIGH} * (T_{MIXED} - T_{NO\ BYPASS}) / (T_{IMPROVED} - T_{STANDARD})$ In summary, review of the compensation calculations demonstrates that with upgrading the heat transfer elements to more efficient profiles, you can reduce the time it would take to recover the SA bypass penalty versus without an element upgrade. With a 10% bypass you would take a 9.34 MMBtu/hr penalty for the time the bypass is open. When the bypass is closed, you wouldn't recover that energy—its lost forever. With a cold end or CE replacement with Applicant's TF4 elements, not only is the penalty reduced to 9.11 MMBtu/hr, with the bypass closed you recover 1.77 MMBtu/hr. Therefore, you would need to operate at the full load no bypass condition for 5.14× the low load 10% bypass condition in order to regain the loss. With both a CE replacement of TF4 and a hot end or HE replacement of Applicant's DN8 elements, the penalty is further reduced to 8.41 MMBtu/hr. With the SA bypass closed at high load you would recover 4.73 MMBtu/hr. Thus, you would need to operate at the full load no bypass condition for 1.78× the low load 10% bypass condition in order to regain the loss. The nominal impact on flue gas outlet temperature with DN8/TF4 upgrade is of little material importance.

In a typical situation, a boiler may operate at low load and design or high load concurrently with the normal demand fluctuations of the electricity grid supplied. Namely, demand typically peaks during the afternoon and evening and drops at other times. With this embodiment of the invention, it is achievable with such a fluctuation as compared to APH with SA bypass without the improved elements to recover the low load penalty if the boiler is operated at high load at a duration equal to the Recovery Factor multiplied by the duration of low load operation. For example, two scenarios shown in Table 3 below demonstrate the APH operating time at high and low load being used to calculate the gain and penalty of this embodiment of the invention. As noted at 50/50 low and high load operation, the invention improves the penalty by 21% and 61% at different levels of element upgrade (T4F only or DN8+TF4 respectively). At 25/75 low and high load operation, the invention improves the penalty by 59% and 162% at different levels of element upgrade (T4F only or DN8+TF4 respectively).

TABLE 3

|  | Time | Existing | TF4 | DN8 TF4 |
| --- | --- | --- | --- | --- |
| High Load | 50% | 0 | 0.89 | 2.36 |
| Low Load | 50% | −4.67 | −4.55 | −4.20 |
| SUM |  | −4.67 | −3.67 | −1.84 |
| % Improvement |  |  | 21% | 61% |
| High Load | 75% | 0 | 1.33 | 3.55 |
| Low Load | 25% | −2.34 | −2.28 | −2.10 |
| SUM |  | −2.34 | −0.95 | 1.45 |
| % Improvement |  |  | 59% | 162% |

Predicted performance of an APH1 at high or design load:

TABLE 1

| Elevation: 7000 feet | Design Load with existing element | Design Load with TF4 element | Design Load with DN8 and TF4 |
| --- | --- | --- | --- |
| Flows: lb/hr |  |  |  |
| Entering pri air | 791450 | 789650 | 776350 |
| Entering sec air | 2428117 | 2428117 | 2435117 |
| Entering gas | 3704199 | 3704199 | 3704199 |
| Leaving pri air | 577450 | 575650 | 570350 |
| Leaving sec air | 2463117 | 2463117 | 2463117 |
| Leaving gas | 3883199 | 3883199 | 3882199 |
| Pri Mill Air By-passed | 85300 | 87100 | 92400 |
| Entering pri air | 121.0 | 121.0 | 121.0 |
| Entering sec air | 97.0 | 97.0 | 97.0 |
| Entering gas | 738.0 | 738.0 | 738.0 |
| Leaving pri air | 706.0 | 707.0 | 713.0 |
| Leaving sec air | 677.0 | 680.0 | 685.0 |
| Leaving gas uncorr. | 301.0 | 299.0 | 296.0 |
| Leaving gas corr. | 293.0 | 291.0 | 288.0 |
| Mixed Primary Air | 633.0 | 633.0 | 633.0 |
| Ave cold end temp | 201.0 | 200.0 | 199.0 |
| cp(air) | 0.24 | Btu/lb*F |  |
| MMBtu/hr | 0 | 1.77 | 4.73 |
| Time to recover (hr/day/yr) | No recovery | −5.14 | −1.78 |
| Temperatures: ° F. |  |  |  |
| Pressure drop pri air | 2.10 | 2.15 | 2.10 |
| Pressure drop sec air | 2.75 | 2.80 | 2.80 |

TABLE 1-continued

| Elevation: 7000 feet | Design Load with existing element | Design Load with TF4 element | Design Load with DN8 and TF4 |
|---|---|---|---|
| Pressure drop gas | 3.55 | 3.60 | 3.60 |
| Hot end diff. sec to gas | 15.00 | 15.00 | 15.00 |
| Hot end diff. pri to gas | 55.00 | 55.00 | 55.00 |
| Cold end diff. sec to gas | 21.30 | 21.40 | 21.40 |
| Cold end diff. pri to gas | 60.65 | 60.75 | 60.70 |
| Specific heat ratio | .9170 | .9170 | .9170 |
| Air to gas | 179000 | 179000 | 178000 |
| Pri to sec | 120000 | 120000 | 112000 |
| Sec to gas | 85000 | 85000 | 84000 |
| Pri to gas | 94000 | 94000 | 94000 |
| Total leakage % | 4.83 | 4.83 | 4.81 |
| Hot End Element | 41-26ga-D59 | 41-26ga-D59 | 41-26ga-DN8 |
| Cold End Element | 36-22ga-F57 | 36-22ga-TF4 | 36-22ga-F57 |

Predicted performance of an APH at low load:

TABLE 2

Size: 1-34.5-VI-77 (89) Trisector

| Elevation: 7000 feet | 33% Load with existing element, i.e. no secondary air bypass | 33% Load with existing element, 10% secondary air by-pass, +10° F. Mixed Mill Temp | 33% Load with TF4 element, 10% secondary air by-pass, +10° F. Mixed Mill Temp | 33% Load with TF4 & DN8 element, 10% secondary air by-pass, +10° F. Mixed Mill Temp |
|---|---|---|---|---|
| Flows: lb/hr | | | | |
| Entering pri air | 450510 | 454410 | 454910 | 453210 |
| Entering sec air | 931053 | 832748 | 832748 | 832748 |
| Entering gas | 1554573 | 1554573 | 1554573 | 1554573 |
| Leaving pri air | 273510 | 278410 | 277910 | 276210 |
| Leaving sec air | 973053 | 875748 | 875748 | 875748 |
| Leaving gas | 1689573 | 1687573 | 1688573 | 1688573 |
| Pri Mill Air By-passed | 92000 | 87100 | 87600 | 89300 |
| Temperatures: ° F. | | | | |
| Entering pri air | 111.0 | 111.0 | 111.0 | 111.0 |
| Entering sec air | 92.0 | 92.0 | 92.0 | 92.0 |
| Entering gas | 585.0 | 585.0 | 585.0 | 585.0 |
| Leaving pri air | 568.0 | 573.0 | 574.0 | 576.0 |
| Leaving sec air | 561.0 | 569.0 | 570.0 | 573.0 |
| Mixed sec air temp | | 521.0 | 522.0 | 525.0 |
| Leaving gas uncorr. | 237.0 | 258.0 | 257.0 | 256.0 |
| Leaving gas corr. | 227.0 | 246.0 | 246.0 | 244.0 |
| Mixed Primary Air | 455.0 | 465.0 | 465.0 | 465.0 |
| Ave cold end temp | 167.0 | 177.0 | 177.0 | 176.0 |
| MMBtu/hr | (penalty) | (9.34) | (9.11) | (8.41) |
| Pressure differentials: inches wg | | | | |
| Pressure drop pri air | 0.70 | 0.70 | 0.75 | 0.70 |
| Pressure drop sec air | 0.60 | 0.50 | 0.55 | 0.50 |
| Pressure drop gas | 0.80 | 0.85 | 0.85 | 0.85 |
| Hot end diff. sec to gas | 5.00 | 5.00 | 5.00 | 5.00 |
| Hot end diff. pri to gas | 36.00 | 36.00 | 36.00 | 36.00 |
| Cold end diff. sec to gas | 6.40 | 6.35 | 6.40 | 6.35 |
| Cold end diff. pri to gas | 37.50 | 37.55 | 37.60 | 37.55 |
| Specific heat ratio | .9320 | 0.9320 | .9320 | .9320 |
| Total leakage: lbs/hr | | | | |
| Air to gas | 135000 | 133000 | 134000 | 134000 |
| Pri to sec | 111000 | 111000 | 111000 | 111000 |
| Sec to gas | 69000 | 68000 | 68000 | 68000 |
| Pri to gas | 66000 | 65000 | 66000 | 66000 |
| Total leakage % | 8.68 | 8.56 | 8.62 | 8.62 |
| Hot End Element | 41-26ga-D59 | 41-26ga-D59 | 41-26ga-D59 | 41-26ga-DN8 |
| Cold End Element | 36-22ga-F57 | 36-22ga-F57 | 36-22ga-TF4 | 36-22ga-TF4 |

TABLE 3

|  |  | Time | Existing | TF4 | DN8 & TF4 |
|---|---|---|---|---|---|
| Scenario 1 | High Load | 50% | 0 | 0.89 | 2.36 |
|  | Low Load | 50% | −4.67 | −4.55 | −4.20 |
|  | SUM |  | −4.67 | −3.67 | −1.84 |
|  | % Improvement |  |  | 21% | 61% |
| Scenario 2 | High Load | 75% | 0 | 1.33 | 3.55 |
|  | Low Load | 25% | −2.34 | −2.28 | −2.10 |
|  | SUM |  | −2.34 | −0.95 | 1.45 |
|  | % Improvement |  |  | 59% | 162% |

The following clauses that are listed as items represent further examples in addition to other examples described herein.

Item 1—An air preheater (APH) temperatures control system, for a boiler's bisector APH 100 comprising a flue gas inlet duct D1, a flue gas outlet duct D2, a combustion air inlet duct D50 and a combustion air outlet duct D100 in fluid communication with a primary air duct D40 and a secondary air duct D60 downstream thereof for feeding in use respectively a first smaller amount of combustion air or primary air V20 to the boiler via at least one pulverizing mill and for and a second larger amount of combustion air or secondary air V30 direct to a boiler, and a heat exchange rotor 20 having a hot end proximate the gas inlet duct D1 and a cold end proximate the combustion air inlet duct D50: wherein the APH 100 further comprises at least a first APH or combustion/secondary air bypass duct D70 in metered communication with the combustion air inlet duct D50 and the secondary air duct D60, adapted in use to bleed a portion of the combustion air V300 as secondary air bypass V40 from the air inlet duct D50 upstream of the APH 100 for reintroduction downstream into the secondary air duct D60, and a flow control device DV10 both for controlling volumetric flow of the secondary air bypass V40 and tempering primary air flow V20 in use operative to maintain the flue gas outlet temperature T2 at or above a desired minimum T9 for the incident flue gas volumetric flow V1 exiting the APH 100 while alone or in conjunction with other tempering means maintaining primary air outlet temperature T10 within a safety range $T10_{MIN}$ to $T10_{MAX}$.

Item 2—An air preheater (APH) temperature control system, for a boiler's trisector APH 1 comprising a flue gas inlet duct D1, a flue gas outlet duct D2, a primary air inlet duct D3 and a primary air outlet duct D4 for feeding a first amount of combustion air or primary air V2 to the boiler via at least one pulverizing mill, a secondary air inlet duct D5 and a secondary air outlet duct D6 for feeding a second amount of combustion air or secondary air V3 direct to a boiler, and a heat exchange rotor 2 having a hot end proximate the gas inlet duct D1 and a cold end proximate the air inlet duct D5: wherein the APH 1 further comprises at least a first APH or secondary air bypass duct D7 in metered communication with the air inlet duct D5 and the air outlet duct D6, adapted in use to bleed a portion of the secondary air V3 as secondary air bypass V4 from the air inlet duct D5 upstream of the APH 1 for reintroduction downstream into the air outlet duct D6, and a flow control device DV1 for metering or controlling volumetric flow of the secondary air bypass V4 and apparatus for tempering primary air flow V2 in use operative to maintain the flue gas outlet temperature T2 at or above a desired minimum T9 for the incident flue gas volumetric flow V1 exiting the APH 1 while maintaining mills outlet temperature T10 within a safety range $T10_{MIN}$ to $T10_{MAX}$.

Item 3—An APH temperature control system in accordance with item 2, further comprising a second APH or primary air bypass duct D8 in metered communication with the primary air inlet duct D3 and the primary air outlet duct D4, adapted in use to bleed a portion of the primary air V2 as primary air bypass V5 from the primary air inlet duct D3 upstream of the APH 1 for reintroduction downstream into the primary air outlet duct D4, and a second flow control device DV2 for metering or controlling volumetric flow of the primary air bypass V5.

Item 4—An APH temperature control system in accordance with item 2 or item 3, in which the flow control device DV1 or DV2 is an electrically and/or pneumatically controlled damper valve.

Item 5—An APH temperature control system in accordance with item 1 or item 2, in which the secondary air bypass V4 or V40 at low load conditions is in the range 5 to 15% of the secondary air V3 fed to the APH 1.

Item 6—An APH temperature control system in accordance with item 3, in which the primary air bypass V5 at low load conditions is in the range 15 to 20% of the primary air V2 fed to the APH 1.

Item 7—An APH temperature control system in accordance with either item 5 or item 6, in which at low load conditions the secondary air bypass V4 is in the order of 10% and the primary air bypass is in the order of 20%.

Item 8—An APH temperature control system in accordance with any one of the preceding items, in which T9 facilitates efficient operation of pollution control equipment disposed downstream of the APH to receive flue gas flow V1 exiting flue gas outlet duct D2.

Item 9—An APH temperature control system in accordance with item 8, in which the pollution control equipment is a water evaporative system.

Item 10—An APH temperature control system in accordance with item 9, in which the water evaporative system is either a spray dryer absorber (SDA) or a circulating dry scrubber (CDS) disposed to receive at least a first portion of the flue gas flow V1 immediately downstream of the APH 1 thereby resulting in a consequent increase in wastewater evaporation therefrom which will reduce wastewater treatment costs associated with inefficient operation of the evaporative system.

Item 11—An APH temperatures control system in accordance with item 9 or item 10, in which at low load conditions the flue gas volumetric flow V1 at or above temperature T9 is sufficient to provide the at least first portion to evaporate all or almost all wastewater fed into the water evaporative system.

Item 12—An APH temperatures control system in accordance with any one of items 9 to 11, in which at low load conditions the flue gas volumetric flow V1 at or above temperature T9 is sufficient in conjunction with the increase in flue gas temperature facilitated by secondary air preheat effected by a steam coil intermediate secondary air fans and the APH to evaporate all or almost all wastewater fed into evaporative system.

Item 13—An APH temperatures control system in accordance with any one of the preceding items, in which the secondary air bypass is pressure drop assisted.

Item 14—An APH temperatures control system in accordance with any one of the items 2 to 13, in which the primary air bypass is pressure drop assisted.

Item 15—A method of controlling temperatures of gases exiting an APH utilizing an APH temperatures control system in accordance with any one of the preceding items.

Item 16—A method of retrofitting a boilers APH installation with an APH temperatures control system in accordance with any one of items 3 to 14 utilizing a pre-existing primary air bypass duct D8 throttled with a pre-existing damper valve DV2 and installing an appropriately sized secondary air bypass duct D7 closable with damper valve DV1, in which during low load operation upon opening of the secondary air bypass valve DV1 and full opening of the primary air bypass valve DV2 the primary air outlet temperature T4 is increased by a predetermined amount sufficient to raise mills outlet temperature T10 near or above a desired $T10_{MIN}$.

Item 17—A retrofit method in accordance with item 16, in which the predetermined amount is about 10 degrees Fahrenheit and the secondary air bypass duct is appropriately sized when cooperating with the fully opened pre-existing primary air bypass duct DV7 to achieve that temperature rise when DV1 is fully open.

Item 18—A retrofit method in accordance with item 18, in which during operation the primary air bypass duct D8 can bypass in the order of 10 to 20% of the primary air flowing into the APH 1 and the secondary air bypass duct D7 can bypass in the order of 0 to 10% of the secondary air flowing into the APH 1.

Item 19—A retrofit method in accordance with any one of items 17 to 19, in which the overall operational efficiency of the installed APH 1 is improved without changing the rotor 2 by retrofitting with baskets comprising more efficient heat transfer elements which in high load conditions compensate for reduced efficiency of APH 1 when secondary air bypass is operative in low load conditions.

Item 20—A method of improving a pre-installed combustion or secondary bisector APH 100 wherein the existing rotor 20 is retrofitted with baskets comprising more efficient heat transfer elements and an APH temperatures control system is installed, in which the APH 100 comprises a flue gas inlet duct D1, a flue gas outlet duct D2, a combustion air inlet duct D50 and a combustion air outlet duct D100 for feeding combustion air or secondary air V30 direct to a boiler, and a heat exchange rotor 20 having a hot end proximate the gas inlet duct D1 and a cold end proximate the combustion air inlet duct D50, and in which: the APH 100 further comprises a first APH or combustion/secondary air bypass duct D70 in metered communication with the combustion air outlet duct D100, adapted in use to bleed a portion of the combustion air V300 as combustion or secondary air bypass V40 from the air inlet duct D50 upstream of the APH 100 for reintroduction downstream into the combustion or secondary air duct D60, and a flow control device DV10 both for metering or controlling volumetric flow of the secondary air bypass V40 and tempering primary air flow V20 in use operative to maintain the flue gas outlet temperature T2 at or above a desired minimum T9 for the incident flue gas volumetric flow V1 exiting the APH 100 while raising the average cold-end temperature or ACET as compared to the pre-installed APH and in use operative when cycling between high and low load conditions to extract substantially more heat from the flue gas than would the pre-installed APH cycling through similar conditions.

Item 22—A method in accordance with item 19 or item 20, in which the more efficient elements are a combination having by weight at least an increase in heat transfer efficiency at design load conditions as that afforded by use of at least one of or a combination of DN8™ and TF4™ elements.

Item 23—A temperature control system for a steam generating system comprising: a pulverizer (400) for pulverizing a fuel, the pulverizer having a pulverizer inlet for receiving fuel and a pulverizer outlet for discharging pulverized fuel therefrom; a boiler (500) in communication with the pulverizer outlet, the boiler being configured to combust the fuel; an air preheater (APH) having a rotor (20) mounted for rotation on a spindle, the air preheater having a plurality of heat transfer elements disposed therein, the heat transfer elements being configured to transfer heat to a gas flowing thereby, the air preheater defining a hot-end (20H) and a cold-end (20C); a flue gas inlet duct (D1) in fluid communication with the hot-end (20H) and a flue gas outlet duct (D2) in fluid communication with the hot-end (20H), wherein the air preheater is configured for flow of a flue gas through the flue gas inlet duct (D1) into and through the hot-end (20H), and discharged from the hot-end (20H) into the flue gas outlet duct (D2); a combustion air inlet duct (D50) in fluid communication with the cold-end (20C) and a combustion air outlet duct (D100) in fluid communication with the cold-end (20C), wherein the air preheater (APH) is configured for flow of combustion air through the combustion air inlet duct (D50) into and through the cold-end (20C), and discharged from the combustion air outlet duct (D100); the combustion air outlet duct (D100) having a primary air branch (D40) that is in fluid communication with the pulverizer inlet and a secondary air branch (D60) that is in direct fluid communication with the boiler; a bypass system in fluid communication with the combustion air inlet duct (D50) and the combustion air outlet duct (D100), the bypass system having a flow regulator (DV10) therein for variably controlling flow of the combustion air through the bypass system from the combustion air inlet duct (D50) to the combustion air outlet duct (D100); a control system comprising a first sensor system configured to measure flue gas outlet temperature (T2) exiting the hot-end (20H) and a second sensor system configured to measure temperature (T10) of air downstream of the primary air branch (D40), the control system having a control unit that controls the flow regulator (DV10) based on temperature input from the first sensor system and the second sensor system, thereby maintaining the flue gas outlet temperature (T2) above a predetermined minimum temperature (T9) and maintaining the temperature (T10) of air downstream of the primary air branch (D40) below a predetermined maximum temperature.

As will be apparent to those skilled in the art, various modifications, adaptations and variations of the foregoing specific disclosure can be made without departing from the scope of the invention claimed herein. The various features, elements and embodiments of the invention described herein may be combined in a manner different than the specific examples described or claimed herein without departing from the scope of the invention. In other words, any element or feature may be combined with any other element or feature in different embodiments, unless there is an obvious or inherent incompatibility between the two, or it is specifically excluded.

References in the specification to "one embodiment," "an embodiment," etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such aspect, feature, structure, or characteristic with other embodiments, whether or not explicitly described.

The singular forms "a," "an," and "the" include plural reference unless the context clearly dictates otherwise. Thus, for example, a reference to "a plant" includes a plurality of such plants. It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The term "and/or" means any one of the items, any combination of the items, or all of the items with which this term is associated. The phrase "one or more" is readily understood by one of skill in the art, particularly when read in context of its usage.

Each numerical or measured value in this specification is modified by the term "about". The term "about" can refer to a variation of ±1%, ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by the skilled artisan, all numbers, including those expressing quantities of reagents or ingredients, properties such as molecular weight, reaction conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range (e.g., weight percents or carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments may be excluded from such categories or embodiments, for example, as used in an explicit negative limitation.

What is claimed is:

1. A method of retrofitting an air preheater installation with a temperature control, wherein the air preheater is a trisector air preheater, the method comprising:
    providing the trisector air preheater comprising:
        a flue gas inlet duct configured for feeding flue gas from a boiler to the trisector air preheater,
        a flue gas outlet duct configured for discharging flue gas from the trisector air preheater,
        a primary air inlet duct configured for providing primary air to the trisector air preheater,
        a primary air outlet duct configured for feeding a first amount of primary air to the boiler via at least one pulverizing mill,
        a secondary air inlet duct configured for feeding a secondary air to the trisector air preheater,
        a secondary air outlet duct configured for feeding a second amount of secondary air direct to the boiler,
        a heat exchange rotor having a hot end proximate the gas inlet duct and a cold end proximate the secondary air inlet duct,
        a secondary air bypass duct in communication with the secondary air inlet duct and the secondary air outlet duct, the secondary air bypass duct configured to bleed a portion of the secondary air as secondary air bypass from the secondary air inlet duct upstream of the trisector air preheater for reintroduction downstream into the secondary air outlet duct, and
    a flow control device for controlling volumetric flow of the secondary air bypass and tempering primary air flow, the primary air flow configured to maintain the flue gas outlet temperature at or above a second minimum temperature for the flue gas volumetric flow exiting the trisector air preheater to maintain primary air outlet temperature within a safety range of a minimum temperature required to facilitate coal drying in the pulverizing mill to a maximum temperature that would lead to auto-ignition of coal in the pulverizing mill; and
    utilizing a pre-existing primary air bypass duct throttled with a pre-existing damper valve; and
    installing an appropriately sized secondary air bypass duct closable with the damper valve,
    wherein during low load operation, upon opening of the damper valve and full opening of the damper valve the primary air outlet temperature is increased by a predetermined amount sufficient to raise primary air outlet temperature to at least a minimum primary air outlet temperature.

2. The method in accordance with claim 1, the control system further comprising:
- a primary air bypass duct in communication with the primary air inlet duct and the primary air outlet duct, the primary air bypass duct configured to bleed a portion of the primary air as primary air bypass from the primary air inlet duct upstream the trisector air preheater for reintroduction downstream into the primary air outlet duct, and
- a second flow control device for controlling volumetric flow of the primary air bypass.

3. The method in accordance with claim 1, wherein: the secondary air bypass at low load conditions is between 5 to 15% of the secondary air fed to the trisector air preheater.

4. The method in accordance with claim 3, wherein the primary air bypass at low load conditions is between 15 to 20% of the primary air fed to the trisector air preheater.

5. The method in accordance with claim 2, wherein at low load conditions the secondary air bypass is 10% and the primary air bypass is 20%.

6. The method in accordance with claim 1, wherein: a second predetermined minimum temperature is configured to facilitate operation of pollution control equipment positioned downstream of the trisector air preheater to receive flue gas flow exiting the flue gas outlet duct.

7. The method temperature control system in accordance with claim 6, wherein the pollution control equipment is a spray dryer absorber (SDA), a circulating dry scrubber (CDS) or a wet flue gas desulfurization system (FGD), further wherein the pollution control equipment is positioned to receive at least a first portion of the flue gas flow immediately downstream of the trisector air preheater, thereby resulting in an increase in wastewater evaporation.

8. The method in accordance with claim 7, wherein when the flue gas volumetric flow is at or above the predetermined minimum temperature at low load conditions, the at least first portion of the flue gas flow to evaporate wastewater fed into the pollution control system.

9. The method in accordance with claim 2, wherein at least one of the secondary air bypass is pressure drop assisted and the primary air bypass is pressure drop assisted.

10. The method in accordance with claim 1, wherein:
the pulverizing mill comprises a pulverizer inlet for receiving fuel and a pulverizer outlet for discharging pulverized fuel therefrom; and
the boiler in communication with the pulverizer outlet, the boiler being configured to combust the fuel,
wherein the trisector air preheater comprises: a rotor mounted for rotation on a spindle; and a plurality of heat transfer elements disposed therein, the heat transfer elements being configured to transfer heat to a gas flowing thereby, the trisector air preheater defining a hot-end and a cold-end.

11. The method in accordance with claim 1, wherein 10 to 20% of the primary air flowing into the trisector air preheater is bypassed and the secondary air bypass duct can bypass in the order of 0 to 10% of the secondary air flowing into the trisector air preheater.

12. The method of claim 1, wherein the combustion air outlet duct branches into the primary air duct and the secondary air duct, and the primary air duct is smaller than the secondary air duct.

* * * * *

UNITED STATES PATENT AND TRADEMARK OFFICE
CERTIFICATE OF CORRECTION

| | |
|---|---|
| PATENT NO. | : 12,287,092 B2 |
| APPLICATION NO. | : 18/277045 |
| DATED | : April 29, 2025 |
| INVENTOR(S) | : Thomas G. Mergler et al. |

It is certified that error appears in the above-identified patent and that said Letters Patent is hereby corrected as shown below:

In the Claims

Claim 7
Column 27, Line 28: After "method", please delete "temperature control system".

Signed and Sealed this
Ninth Day of September, 2025

Coke Morgan Stewart
*Acting Director of the United States Patent and Trademark Office*